United States Patent
Bratkovski et al.

(10) Patent No.: US 7,532,119 B2
(45) Date of Patent: May 12, 2009

(54) MULTI-TIERED NETWORK FOR GATHERING DETECTED CONDITION INFORMATION

(75) Inventors: Alexandre M. Bratkovski, Mountain View, CA (US); Zhiyong Li, Palo Alto, CA (US); Geoffrey Lyon, Menlo Park, CA (US); Philip Kuekes, Menlo Park, CA (US); Shih Yuang Wang, Palo Alto, CA (US); R. Stanley Williams, Portola Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 525 days.

(21) Appl. No.: 11/269,237

(22) Filed: Nov. 8, 2005

(65) Prior Publication Data

US 2007/0103305 A1 May 10, 2007

(51) Int. Cl.
*G08B 13/14* (2006.01)
(52) U.S. Cl. .............................. 340/572.1; 340/539.22
(58) Field of Classification Search ............. 340/572.1, 340/10.1, 539.1, 539.22
See application file for complete search history.

(56) References Cited

U.S. PATENT DOCUMENTS 5,774,876 A * 6/1998 Woolley et al. ............... 705/28
2003/0236866 A1 12/2003 Light
2004/0113790 A1 6/2004 Hamel et al.
2005/0088299 A1 4/2005 Bandy et al.

FOREIGN PATENT DOCUMENTS

WO WO2005/043930 5/2005

OTHER PUBLICATIONS

Corke, P. et al., "Deployment and Connectivity Repair of a Sensor Net with A Flying Robot", downloaded Sep. 27, 2005.
Huang, G. T., "Casting the Wireless Sensor Net", Technology Review, Jul./Aug. 2003.
Yao, Y. et al., "Query Processing for Sensor Networks", Proc. of the 2003 CIDR Conference.
Heterongeneous Sensor Networks, Sensor Nets/RFID, http://www.intel.com/research/explaoratory/heterogeneous.htm, downloaded Sep. 27, 2005.
Sensor Nets/RFID, Research Areas, http://www.intel.com/research/exploratory/wireless_sensors.htm, downloaded Sep. 27, 2005.
Tinyos, http://www.tinyos.net/special/mission, downloaded Sep. 27, 2005.

* cited by examiner

*Primary Examiner*—Jeffery Hofsass (57) ABSTRACT

A multi-tiered network for gathering detected condition information includes a first tier having first tier nodes and a second tier having a second tier node. The second tier node is operable to receive detected condition information from at least one of the first tier nodes in a substantially autonomous manner. In addition, the second tier node is operable to at least one of store, process, and transmit the detected condition information. The network also includes a third tier having a third tier node configured to receive the detected condition information and to at least one of store and process the detected condition information.

19 Claims, 6 Drawing Sheets

MULTI-TIERED NETWORK FOR GATHERING DETECTED CONDITION INFORMATION

TECHNICAL FIELD

The present invention pertains to nodes in a network. More particularly, the present invention pertains to a multi-tiered network of nodes for gathering detected condition information.

BACKGROUND

Radio frequency identification device (RFID) systems are widely used for tracking and other applications in many different types of industries. A typical RFID system includes RFID tags and an RFID reader that reads information from the RFID tags. The RFID reader typically includes a transmitter that outputs radio frequency (RF) signals through an antenna to create an electromagnetic field that enables the tags to return an RF signal carrying the information stored in the tag, which is received by the reader. Some types of conventional tags are "passive" tags, such as tags without an internal power source that may be energized by the electromagnetic field generated by the reader, and "active tags", such as tags with an internal power source.

Generally, the purpose of conventional RFID systems is to enable data to be transmitted by a mobile device, sometimes referred to as a tag, which is read by an RFID reader and processed according to the needs of a particular application. The data transmitted by the tag typically provides identification or location information, or specifics about the product tagged, such as price, color, or date of manufacturing.

Conventional RFID systems, however, are typically limited in their applications due to the relatively high costs associated with receiving, collecting, and processing information from the RFID systems. In addition, conventional RFID systems typically have relatively low reliabilities that often render them unsuitable for use in harsh or changing environments because of their relatively low fault tolerance and survivability. It would therefore be desirable to have RFID systems that are relatively inexpensive to operate and have relatively high levels of reliability and tolerance to thereby enable a broader range of applications.

SUMMARY

A multi-tiered network for gathering detected condition information is disclosed. The network includes a first tier having first tier nodes and a second tier having a second tier node. The second tier node is operable to receive detected condition information from at least one of the first tier nodes in a substantially autonomous manner. In addition, the second tier node is operable to at least one of store, process, and transmit the detected condition information. The network also includes a third tier having a third tier node configured to receive the detected condition information and to at least one of store and process the detected condition information.

BRIEF DESCRIPTION OF THE DRAWINGS

Various features of the embodiments can be more fully appreciated, as the same become better understood with reference to the following detailed description of the embodiments when considered in connection with the accompanying figures.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

A network comprising multi-tiered nodes and a method for communicating in the network are described herein. One tier of nodes in the network is capable of gathering information, such as by detecting a condition with a sensor. Another tier of nodes is capable of receiving the gathered information and reporting that information to a third tier of nodes. The third tier of nodes may process the information gathered by the first and second tier nodes and may output the processed information to a user. As described in greater detail herein below, the architecture of the multi-tiered nodes makes them tailorable to a variety of applications in a relatively easy manner, especially those applications that require ubiquitous operation and high adaptability and survivability in changing environments.

Through implementation of the multi-tiered nodes and communication method disclosed herein, detected condition information may be gathered in a relatively efficient and comprehensive manner. For instance, information may be gathered through use of a relatively large number of first tier nodes at relatively low costs because the first tier nodes may comprise relatively inexpensive devices. In addition, the first tier nodes may be configured to detect any number of various conditions while requiring relatively small amounts of energy.

Moreover, the second tier nodes may be configured to gather information from the first tier nodes in a substantially autonomous manner. In other words, the second tier nodes may be configured to gather the detected condition information from the first tier nodes without requiring substantial human intervention. In one example, the second tier nodes may supply radio frequency (RF) signals to the first tier nodes, which may use the RF signals to generate sufficient electrical energy to enable the transmission of information to the second tier nodes. In addition, the second tier nodes are generally re-configurable, defect-tolerant, require relatively low amounts of power, provide relatively efficient networking of information, etc., as described in greater detail herein below.

Figure 1A:
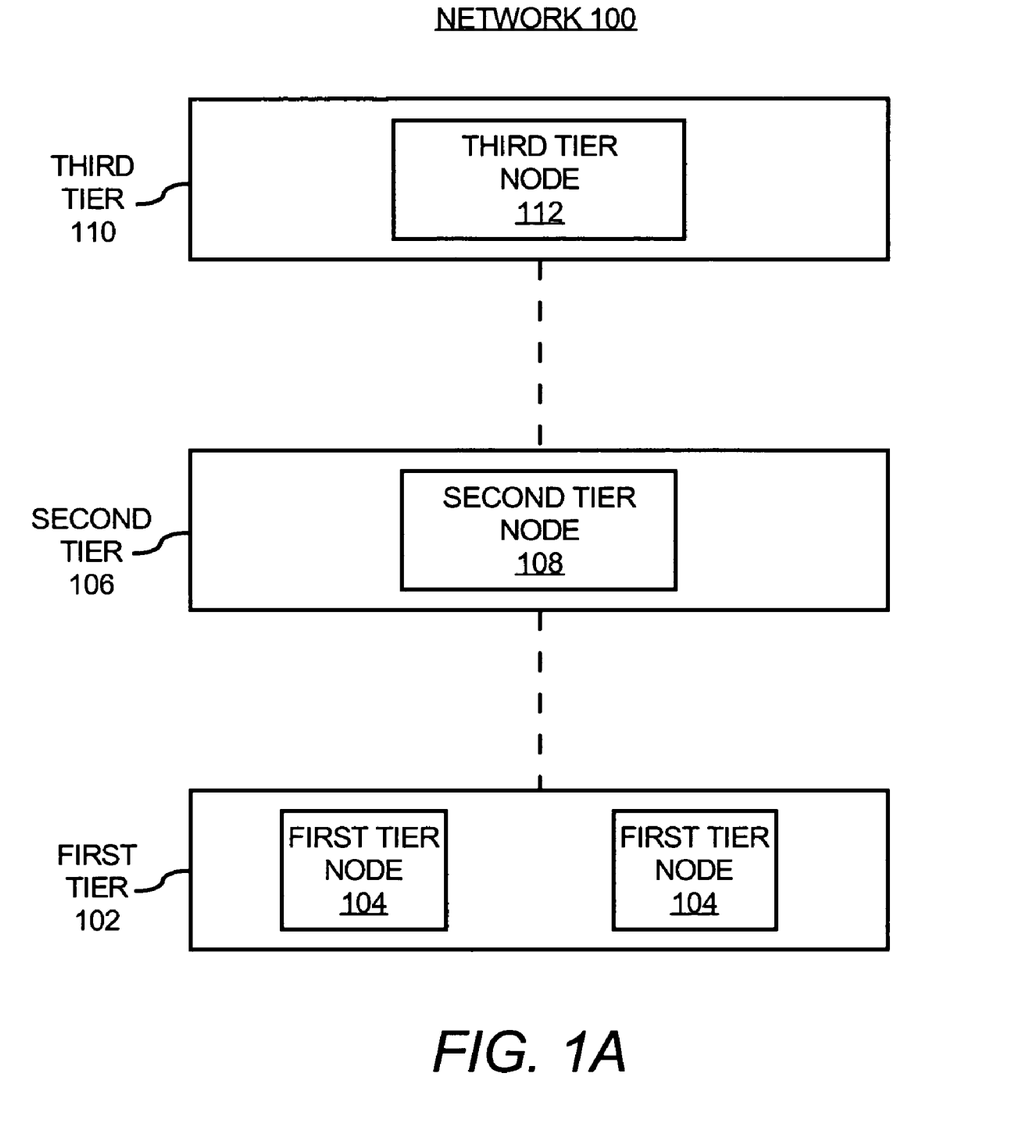
FIG. 1A illustrates a network for gathering detected condition information, according to an embodiment.

With reference first to FIG. 1A, there is shown a multi-tiered network 100 for gathering detected condition information, according to an embodiment. The network 100 may include a first tier 102, a second tier 106, and a third tier 110. The first tier 102 may include a plurality of first tier nodes 104. The second tier 106 may include at least one second tier node 108. The third tier 110 may include at least one third tier node 112. The first tier 102 may comprise a bottom layer, the second tier 106 may comprise a middle layer, and the third tier 110 may comprise a top layer.

As FIG. 1A illustrates, the first tier nodes 104 may communicate with the second tier nodes 108. In addition, the second tier nodes 108 may also communicate with the third tier nodes 112. Although not illustrated in FIG. 1A, the first tier nodes 104 may also communicate directly with the third tier nodes 112 in certain embodiments. Various configurations and operations of the nodes 104, 108, 112 are described in greater detail herein below with respect to FIG. 2.

Figure 1B:
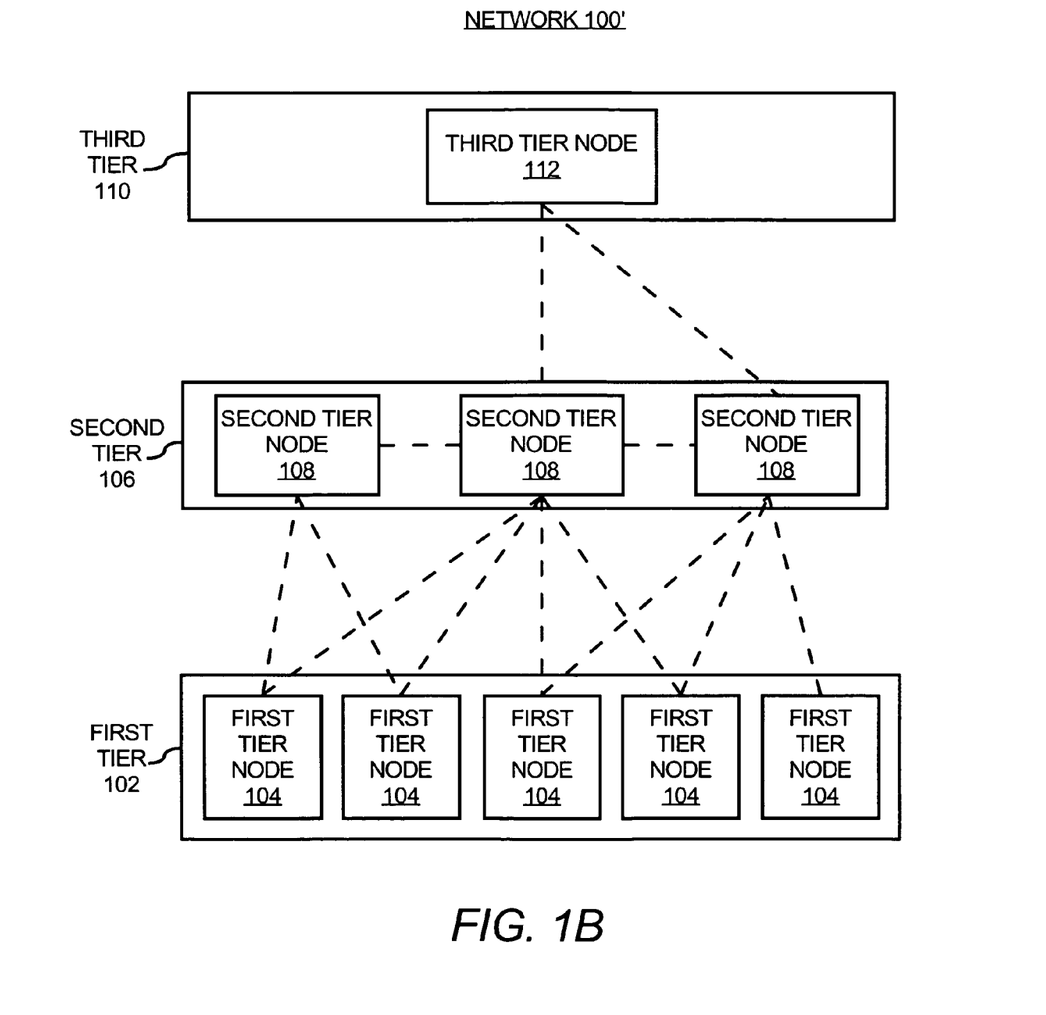
FIG. 1B illustrates a network for gathering detected condition information, according to another embodiment.

Turning now to FIG. 1B, there is illustrated a multi-tiered network 100' for gathering detected condition information according to another embodiment. As shown, the network 100' includes a plurality of first tier nodes 104 and the second tier 106 includes multiple second tier nodes 108. The second tier nodes 108 may communicate with one or more first tier nodes 104, as represented by the dashed lines. In addition the second tier nodes 108 may communicate with each other. The second tier nodes 108 may transmit information to another second tier node 108 through multi-hopping. Multi-hopping may obviate the need for all of the second tier nodes 108 to communicate with the third tier node 112 since this information may be communicated between the second tier nodes 108. In this regard, a second tier node 108 may receive information from other second tier nodes 108 and may communicate the gathered information to the third tier node 112.

Communication between the second tier nodes 108, the first tier nodes 104, and the third tier node 112, includes any exchange of information, and may generally be conducted wirelessly, but may also include the use of wires in some embodiments.

Figure 2:
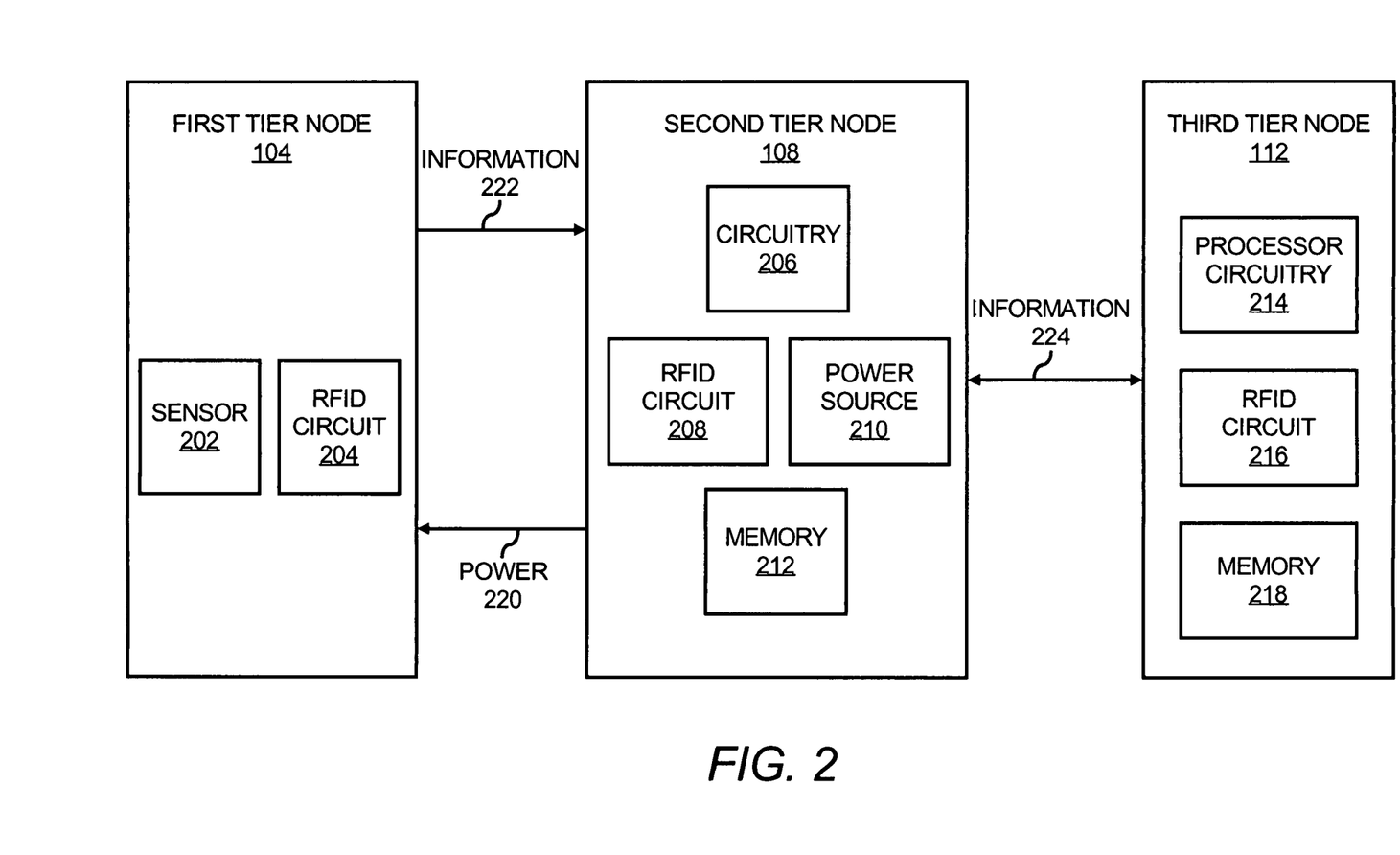
FIG. 2 illustrates a block diagram of the nodes in the networks depicted in FIGS. 1A and 1B, according to an embodiment.

FIG. 2 illustrates a block diagram of the nodes in the networks 100, 100' depicted in FIGS. 1A and 1B, according to an embodiment. FIG. 2 includes a first tier node 104, a second tier node 108, and a third tier node 112. For simplicity, only a single first tier node 104, second tier node 108, and third tier node 112 are illustrated. It should, however, be understood that any reasonably suitable number of first tier nodes 104, second tier nodes 108, and third tier nodes 112 may be employed in the network 200 without departing from a scope of the network 200.

As shown in FIG. 2, the first tier node 104 includes sensor(s) 202 and an RFID circuit 204. The second tier node 108 includes circuitry 206, an RFID circuit 208, a power source 210, and a memory 212. The third tier node 112 includes processor circuitry 214, an RFID circuit 216, and a memory 218. An arrow 220 designating an RF signal 220 transmitting from the second tier node 108 and received by the first tier node 104 is depicted in FIG. 2. An arrow designating information 222 being communicated from the first tier node 104 to the second tier node 108 is also illustrated. In addition, an arrow designating communication of information 224 between the second tier node 108 and the third tier node 112 is further illustrated in FIG. 2.

The first tier node 104 may generally comprise a passive tag because the first tier node 104 does not have a power source. A plurality of first tier nodes 104 may be employed and may provide several advantages. For instance, the first tier nodes 104 may be relatively small and may consume a relatively low amount of power. In addition, the first tier nodes 104 may have a relatively long functional life because the first tier nodes 104 may not be required to rely upon power drawn from internal batteries to function.

The sensor 202 may include any reasonably suitable device for sensing a condition, which may include for instance, any reasonably suitable type of chemical, thermal, mechanical, electrical, biological, optical stimuli, or other stimuli, such as stress, vibration, or movement. In some embodiments, the first tier nodes 104 may contain a plurality of sensors 202. If a first tier node 104 contains multiple sensors 202, they may all be the same type of sensor 202. For example, a first tier node 104 may contain three sensors 202, where all three sense the same type of chemical. In addition, or alternatively, the sensor 202 of the first tier nodes 104 may be capable of detecting a plurality of conditions.

The sensors 202 on a first tier node 104 may differ slightly. For example, a first tier node 104 may contain three chemical sensors 202, but each sensor 202 may sense a different type of chemical. Alternatively, a first tier node 104 may contain multiple sensors 202, where each sensor 202 senses a completely different type of stimuli. For example, one first tier node 104 may contain two or more of a biological sensor, a chemical sensor, a vibration sensor, an electronic sensor, and a heat sensor. The combination of sensors 202 contained in a first tier node 104 may be used interchangeably without limitation. Similarly, the types of sensors 202 on a first tier node 104 may be used interchangeably within a network 100 or 100' without limitation. For example, a first tier node 104 having multiple chemical sensors may be deployed in the same tier 102 of the same network 100, 100' alongside first tier nodes 104 having biological and mechanical sensors.

The RFID circuit 204 may include a device for receiving and transmitting RF signals. The RFID circuit 204 may store identification information including a unique identification ("ID") code to identify the first tier node 104. The RFID circuit 204 may also store other information. For example, the RFID circuit 204 may store information about the first tier node 104 to which it is attached, historical information, such as when the first tier node 104 was created, etc. The RFID circuit 204 may also store the information sensed by the sensor 202. The RFID circuit 204 uses radio frequency technology to transmit the information stored in the RFID circuit 204. In addition, or alternatively, the RFID circuit 204 may transmit the information sensed by the sensor 202 without first storing the information.

The RFID circuit 204 may also receive RF transmissions, which may contain communication transmissions. Communication transmissions may contain one or both of information transmissions and command transmissions. Information transmissions include data sent by other nodes in any tier of the network. Command transmissions may include signals sent from a second tier node 108 or a third tier node 112 that instruct the first tier node 104 to take some type of action. For example, a second tier node 108 may send a command transmission to a first tier node 104 instructing it to either activate or deactivate a sensor 202. In one embodiment, the first tier node 104 may contain a plurality of sensor 202. The sensor 202 may be configured to sense different types of stimuli. In this example, the second tier node 108 may send a command transmission instructing the first tier node 104 to activate a particular type of sensor 202.

The RFID circuit 204 may also receive RF signal transmissions, which the RFID circuit 204 may convert into electrical energy in manners generally known to those of ordinary skill in the art. The first tier node 104 may use the electrical energy to enter into a powered state. In the powered state, the first tier node 104 may perform one or more of sensing information with the sensor 202, activating and deactivating sensors 202, receiving transmissions, sending transmissions, etc. For example, the first tier node 104 may receive external RF signals, activate to a powered state, sense information, and transmit the sensed information to the second tier node 108.

RF signals 220 may be supplied to the first tier node 104 by one or more of the second tier node 108, the third tier node 112, and an external device (not shown). For example, the first tier node 104 may be dormant, for instance, the first tier node 104 may be unpowered and inactive, until the first tier node 104 receives an RF transmission. The first tier node 104 may convert this RF transmission into electrical power and become activated into a powered state.

By way of example, a plurality of first tier nodes 104 may be dispersed over a relatively wide geographic area in an outdoor environment and the external device may comprise a vehicle, such as an unmanned aerial drone, configured to fly overhead while broadcasting RF signals to the dispersed first tier nodes 104. The first tier nodes 104 may receive the RF signals and may activate themselves into a powered state. As another example, the external device may comprise other types of vehicles, such as manned or unmanned automobiles, which may also be used to broadcast RF signals to the first tier nodes 104.

According to another embodiment, the first tier node 104 may also receive wireless transmissions in the form of laser beams, which the first tier node 104 is configured to convert into electrical power. The first tier node 104 may convert the laser beam into electrical energy in any reasonably suitable known manner.

In order to receive the RF signals 220 or other types of powering signals, the first tier node 104 may contain an antenna (not shown). The antenna may assist the first tier nodes 104 in sending and receiving information. The antenna may be any type known in the art including, for instance, antennae fabricated through the use of printed antenna technology. An antenna may be attached to the RFID circuit 204 directly or may be placed at various other locations on the first tier nodes 104. A first tier node 104 may also have multiple antennas placed in a variety of locations on the first tier node 104.

The first tier node 104 may contain additional circuitry not illustrated in FIG. 2. The additional circuitry may include various types of electronic circuitry. The additional circuitry may provide the first tier node 104 with additional performance and computational capabilities. Additional performance and computational capabilities may include enhancing the first tier node's 104 sensing abilities, enhancing its wireless transmission capabilities, including amplification of the signal for the sensed information prior to transmission, enhancing storage capabilities, and the like. For example, the first tier node 104 may be equipped with a relatively small amount of memory to store information sensed by the sensor 202.

The second tier node 108 may generally comprise an active tag because the second tier node 108 includes a power source 210. The second tier node 108 may contain a similar RFID circuit 208 as the RFID circuit 204 contained in first tier node 104. In this regard, for instance, the RFID circuit 208 may include a device for receiving RF signals and transmitting RF signals. The RFID circuit 208 may also store identification information including a unique identification ("ID") code to identify the second tier node 108. The RFID circuit 208 may also store other information. For example, the RFID circuit 208 may store information about the second tier node 108 to which it is attached, the second tier node 108 historical information, such as when the second tier node 108 was created, etc.

The RFID circuit 208 may receive RF transmissions which include communication transmissions. The communication transmissions may contain one or both of information transmissions and command transmissions. Information transmissions may include data sent by one or more nodes 104, 108, 112. Command transmissions may include signals sent from other second tier nodes 108 or a third tier node 112 that may instruct the second tier node 108 to take some type of action. For example, a third tier node 112 may instruct a second tier node 108 to send RF signals to the first tier nodes 104 or transmit pre-processed information to the third tier node 112. A second tier node 108 may also transmit information to other second tier nodes 108 and to the third tier node 112 automatically. For example, the second tier node 108 may transmit information received from the first tier node 104 to at least one of a second node 108 and a third node 112. As another example, the second tier node 108 may pre-process and may transmit this information to a third tier node 112 after the pre-processing is completed.

The RFID circuit 208 may also receive RF signals. Although the second tier nodes 108 may contain an internal power source 210, they may also be configured to convert the RF signals into electrical energy. In addition, the second tier node 108 may contain any reasonably suitable type of battery known in the art. For instance, the power source 210 may be an organic thin film, reasonably suitable type of power source which draws solar, light, or microwave energy, a rechargeable battery, etc.

The second tier node 108 may include a memory 212, which may include any reasonably suitable types of circuits or chips for storing information. The second tier node 108 may also contain additional circuitry 206. The circuitry 206 may provide the second tier node 108 with additional performance and computational capabilities. The additional performance and computational capabilities may include enhancement of the wireless transmission capabilities of the second tier node 108, such as, through amplification of the signal for the sensed information prior to transmission, enhanced storage capabilities, enhanced power and longevity, etc.

The circuitry 206 may provide the second tier node 108 with additional computational capabilities including data processing or pre-processing capabilities. The pre-processing may include, for instance, analog to digital conversion, data processing, data analysis, including Fourier or wavelet transforms, pattern recognition, data summarization, local data storage including the ability to write information into local memory, such as an embedded microprocessor, etc. The circuitry 206 may also include an application specific integrated circuit (ASIC).

The pre-processing capability provided by the circuitry 206 may also include local area computation. Local area computation may include analysis of data collected by the second tier node 108 from a local group of first tier nodes 104. The local area computation may also include analysis of data received from other second tier nodes 108 within the network 100, 100'.

As another example, the second tier node 108 may localize significant phenomena, such as impact or delamination, and analyze the impact damage or delamination shape. For example, a plurality of first tier nodes 104 may be disposed across the front and sides of a vehicle and may be configured to transmit data to the second tier node 108. If an object strikes the vehicle at a specific point, the second tier node 108 may process information received from the first tier nodes 104 to determine exactly where the strike occurred on the vehicle, the size of the object, the speed and force with which it struck, etc. In this regard, for instance, within the struck region, the second tier node 108 may be able to determine the extent of the damage to the vehicle. Thus, the data from the sensors 202 of the first tier nodes 104 may be analyzed and pre-processed by the second tier node 108 before the data is sent to a third tier node 112 for further processing and analysis.

The second tier node 108 may also contain sensors (not shown). The second tier node 108 may, for instance, contain one or more of the sensors described above with respect to the first tier nodes 104. In addition, the second tier node 108 may contain sensors that require a level of power that a first tier node 104 cannot provide. The circuitry 206 may improve the capabilities of the sensors contained in the second tier node 108. In one embodiment, circuitry 206 may allow a sensor to retain local memory of the most significant events its senses. For example, a thermal protection system (TPS) sensor may retain memory of the highest temperature observed along with a recording of cumulative thermal exposure for the lifetime of the nearby TPS element. Similarly, the second tier node 108 may be deployed in the external skin of a vehicle to detect and retain memory of highest gravitational acceleration and cumulative strain.

The third tier node 112 may be a computing platform including software, hardware, or a combination of software and hardware. The third tier node 112 may contain application software for processing and analyzing information received from the second tier nodes 108 and the first tier nodes 104. For example, the first tier nodes 104 may be placed in a vehicle skin for monitoring the structural integrity of the vehicle. The third tier node 112 may contain software for processing and analyzing the information received from the first tier nodes 104 either directly or through one or more second tier nodes 108. The software may analyze the information obtained from the first tier nodes 104 and may, for instance, display to a user the region of the vehicle that is structurally weakened.

The third tier node 112 may also contain a variety of software or hardware unrelated to communications with the second tier nodes 108 or the first tier nodes 104. For example, the third tier node 112 may be a CPU, a laptop computer, a server, a datacenter, etc. The tier node 112 may also be carried in a vehicle, such as an unmanned drone or an automobile.

The third tier node 112 may contain any reasonably suitable type of power source. In addition, the third tier node 112 may contain an RFID circuit 216 for receiving and transmitting RF signals. The RFID circuit 216 may be the same as the RFID circuit 204 contained in the first tier nodes 104, the same as the RFID circuit 208 contained in the second tier nodes 108, or may be different from the other RFID circuits 204, 208. For example, the RFID circuit 216 contained in the third tier node 112 may be relatively larger and more powerful than the other RFID circuits 204, 208. Although not illustrated, the third tier node 112 may also contain one or more sensors. The sensors used in the third tier nodes 112 may be the same as the sensors 202 used in the first tier nodes 104, the same as the sensors used in the second tier nodes 108, or different from the other sensors 202.

The third tier node 112 may be located in the same geographic region as the other first and second tier nodes 104, 108 in the network 100, 100'. For example, a network 100, 100' may be disposed in a vehicle skin to monitor the vehicle for impact or structural integrity. The third tier node 112 may be located in the vehicle as well, so that individuals operating the vehicle may view and analyze the information gathered from the network 100, 100' in realtime.

The third tier node 112 may also be located in a remote location from the first and second tier nodes 104, 108 of the network 100, 100'. For example, the network 100, 100' may be deployed in an outdoor environment, containing dangerous or adverse conditions. For instance, the network 100, 100' may be used to monitor a battlefield for the use of biological weapons. In this example, the third tier node 112 may be located in a relatively secure location, remote from the battlefield. The third tier node 112 may communicate wirelessly with the other nodes of the network 100, 100' so that a user may monitor the information gathered from the network 100, 100' at a relatively safe distance. The third tier node 112 may also be located in a position remote from the other nodes of a network 100, 100' for logistical, financial, or convenience reasons. For example, the third tier node 112 may be located at a centralized data center, which communicates with multiple networks deployed at various locations.

The network 100, 100' may also contain one or more hybrid nodes. Hybrid nodes are nodes having the capability to function in multiple operating states. The operating states may include functioning as a first tier node 104 and functioning as a second tier node 108, and may thus include features from the first tier node 104 and the second tier node 108 depicted in FIG. 2. For example, the hybrid node may have an internal power source 210 that is normally turned off, so that the hybrid node typically functions like a first tier node 104. In addition, the hybrid node may include an RFID circuit 204 and a sensor 202. Similar to a first tier node 104, the hybrid node may lie dormant until it receives an RF signal. Upon receipt of the RF signal the hybrid node may activate to a powered state and perform some of all of the same actions described above with respect to the first tier node 104.

The hybrid node may also have the capability to turn on its internal power source 210 and function as the second tier node 108 in various circumstances. In one example, the hybrid node may begin functioning as the second tier node 108 at a preprogrammed time, upon receipt of a stimulus, etc. The stimulus may include, for instance, a signal transmitted by another second tier node 108, a third tier node 112, or an external device. In addition, or alternatively, the stimulus may be disrupted communications with a second tier node 108. In this example, the hybrid node may be functioning as a first tier node 104, receiving RF signals from a second tier node 108. In response to the RF signal from the second tier node 108 ceasing, the hybrid node may be programmed to begin functioning as a second tier node 108. When the hybrid node begins functioning as a second tier node 108, the hybrid node may perform some or all of the activities of the second tier node 108, including sending and receiving RF signals to one or more first tier nodes 104. In one respect, therefore, the hybrid node may operate to replace a damaged or otherwise malfunctioning second tier node 108.

The various nodes 104, 108, 112 of the network 100, 100' may be virtually any size. First tier nodes 104 may be measured in nanoscale, depending on the particular application. For example, first tier nodes 104 may be sufficiently small to be placed inside a cell of an organism. The various nodes 104, 108, 112 in the network 100, 100' may also be extremely large where the application allows or requires it. For example, if a first tier node 104 or a second tier node 108 requires hundreds of sensors then the nodes may be sufficiently large to contain all of these components.

The various nodes 104, 108, 112 of the network 100, 100' and their various components may be modular. That is, the nodes 104, 108, 112 and their components may be designed with standardized units or dimensions. Modularity may provide the nodes 104, 108, 112 with the ability to be easily assembled, modified, or repaired. Modularity also provides flexibility to custom design limitless types of nodes for a variety of applications. For example, a component of a first tier node 104 may be easily removed and replaced by another component. For instance, a first tier node 104 may contain a plurality of chemical sensors. If the application warrants, one or all of these sensors may be quickly removed and replaced with other types of sensors, such as biological sensors. Similarly, a second tier node 108 may contain an ASIC. The ASIC may be removed from the second tier node 108 and replaced with an updated ASIC or another type of electronic circuitry.

The nodes 104, 108, 112 of the network 100, 100' may, for instance, be imbedded in a small area, a vehicle, or may be spread out across a wide area. In one example, a network 100, 100' of nodes 104, 108, 112 may be deployed on a battlefield. In this example, the first tier nodes 104 may be equipped with a number of different sensors including, for instance, motion and pressure sensors to monitor the battlefield. When an object, such as a tank, passes over part of the network 100, 100', the first tier nodes 104 may determine exactly where the tank has passed. The local group of second tier nodes 108 in that area where the tank passed may also pre-process the information.

Pre-processing, in this example, may include determining what direction the tank is traveling, the number of tanks that have passed, how fast they are moving, how much they weigh, etc. The group of second tier nodes 108 in the localized area may communicate with each other to determine this information. For example, if a first tier node 104 senses the pressure of a vehicle, it may communicate this information along with the time it was sensed to nearby second tier nodes 108. The nearby second tier node 108 may gather information from a plurality of first tier nodes 104 and other second tier nodes 108 and use this information to determine what direction and how fast the vehicle is moving. This pre-processed data may be sent to a third tier node 112 for further processing and analysis. For example, the third tier node 112 may include tank analysis software, which may determine the type of tank and what equipment it is carrying based on the weight and speed information determined by the localized nodes in the network 100, 100'.

In some embodiments, a plurality of second tier nodes 108 within a network 100, 100' may remain dormant. The second tier nodes 108 may be inactivated for a variety of reasons, including power conservation, the desire to reduce radio transmissions in furtive applications, etc. The second tier nodes 108 may be preprogrammed to activate at a certain time or in response to certain conditions. For example, a number of second tier nodes 108 placed in strategic locations in the network 100, 100' may remain active. These second tier nodes 108 may act as "sentry" nodes to monitor for one or more stimuli. These second tier nodes 108 may be substantially specialized for the purpose of sensing a particular stimuli and alerting nearby second tier nodes 108. For example, these second tier nodes 108 may remain active, monitoring for the presence of chemical agents. When a sentry node 108 detects a chemical agent, these second tier nodes 108 may send a signal activating another second tier node 108, which in turn, may send RF signals, and may activate a first tier node 104.

The various environments in which the nodes 104, 108, 112 may be placed include outdoor areas, such as fields, deserts, oceans, forests, etc. The nodes 104, 108, 112 may also be placed in vehicles, such as space vehicles, submersible vehicles, automobiles, rail vehicles, military vehicles, etc. In this example, the nodes 104, 108, 112 may be included into any part of a vehicle, such as the outer skins, tires, engines, etc. Moreover, the nodes 104, 108, 112 may be located in any reasonably suitable mechanical or electrical equipment, wearable garment, animal skins, buildings, nuclear reactors, etc. The environment may further include a surface or a multi-dimensional space, such as a multi-layered surface or field or interior of a container or building.

The nodes 104, 108, 112 may be deployed in various ways, ranging from being strategically placed to being randomly dispersed. For example, the nodes 104, 108, 112 may be deployed in a relatively precise manner, such as on a space shuttle. As another example, the nodes 104, 108, 112 may be deployed in a substantially random manner, such as in an expansive outdoor environment, such as a battlefield. In this application, the nodes 104, 108, 112 may be deployed in a variety of ways, including being dropped from an airplane or shot out of a gun. The nodes 104, 108 may, moreover, be sufficiently small and light to be spread by wind or water currents.

Once deployed, the third tier node 112 may determine the locations of the first tier nodes 104 and the second tier nodes 108. The locations may be determined through use of a global positioning system (GPS), which may provide longitude and latitude information. In one example, the third tier node 112 may actively query the nodes 104, 108 to determine their locations. In another example, the nodes 104, 108 may automatically transmit their location information to the third tier node 112.

Figure 3:
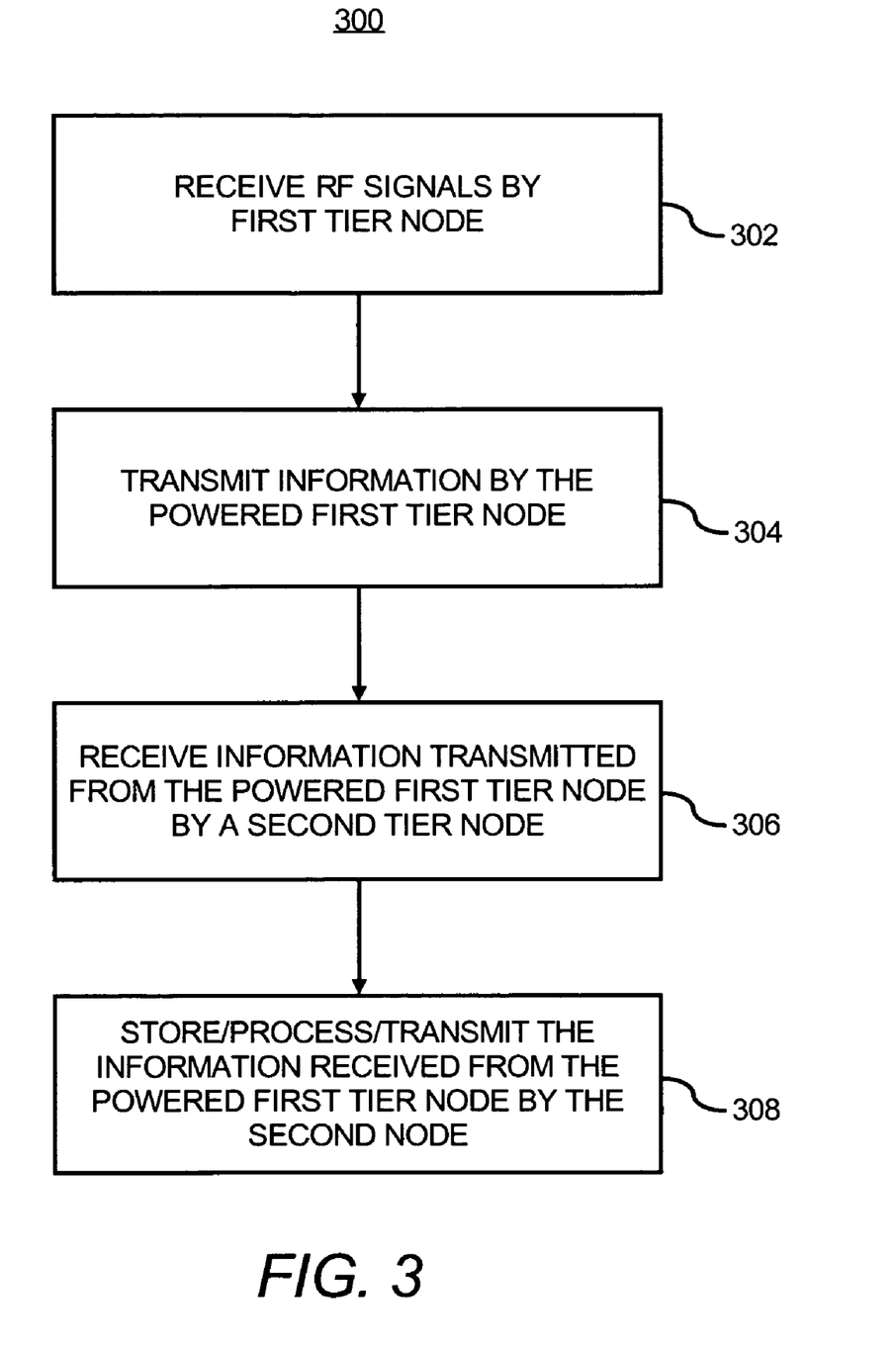
FIG. 3 illustrates a flow chart of a method for communicating detected condition information across a multi-tiered network, according to an embodiment.

FIG. 3 illustrates a flow chart of a method 300 for communicating detected condition information across a multi-tiered network, according to an embodiment. The method 300 is described with respect to FIGS. 1A, 1B, and 2 by way of example and not of limitation and it will be apparent that the method 300 may be used in other systems.

At step 302, the first tier node 104 may receive an RF signal 220. The RF signal 220 may be supplied from a second tier node 108, a third tier node 112, or a device external (not shown) to the network 100, 100'. In addition, the first tier node 104 may convert the RF signal 220 to electrical energy as described herein above. At step 304, the powered first tier node 104 may transmit detected condition information. The detected condition information transmitted by the first tier node 104 may include information sensed by a sensor 202, as well as identification or location information.

At step 306, the second tier node 108 may receive the detected condition information transmitted by the first tier node 104 in a substantially autonomous manner. In other words, the second tier node 108 may operate to receive the information from the first tier node 104 without substantial human intervention. At step 308, the second tier node 108 may at least one of store, process, and transmit the information received from the first tier node 104, as described in greater detail herein above.

Figure 4:
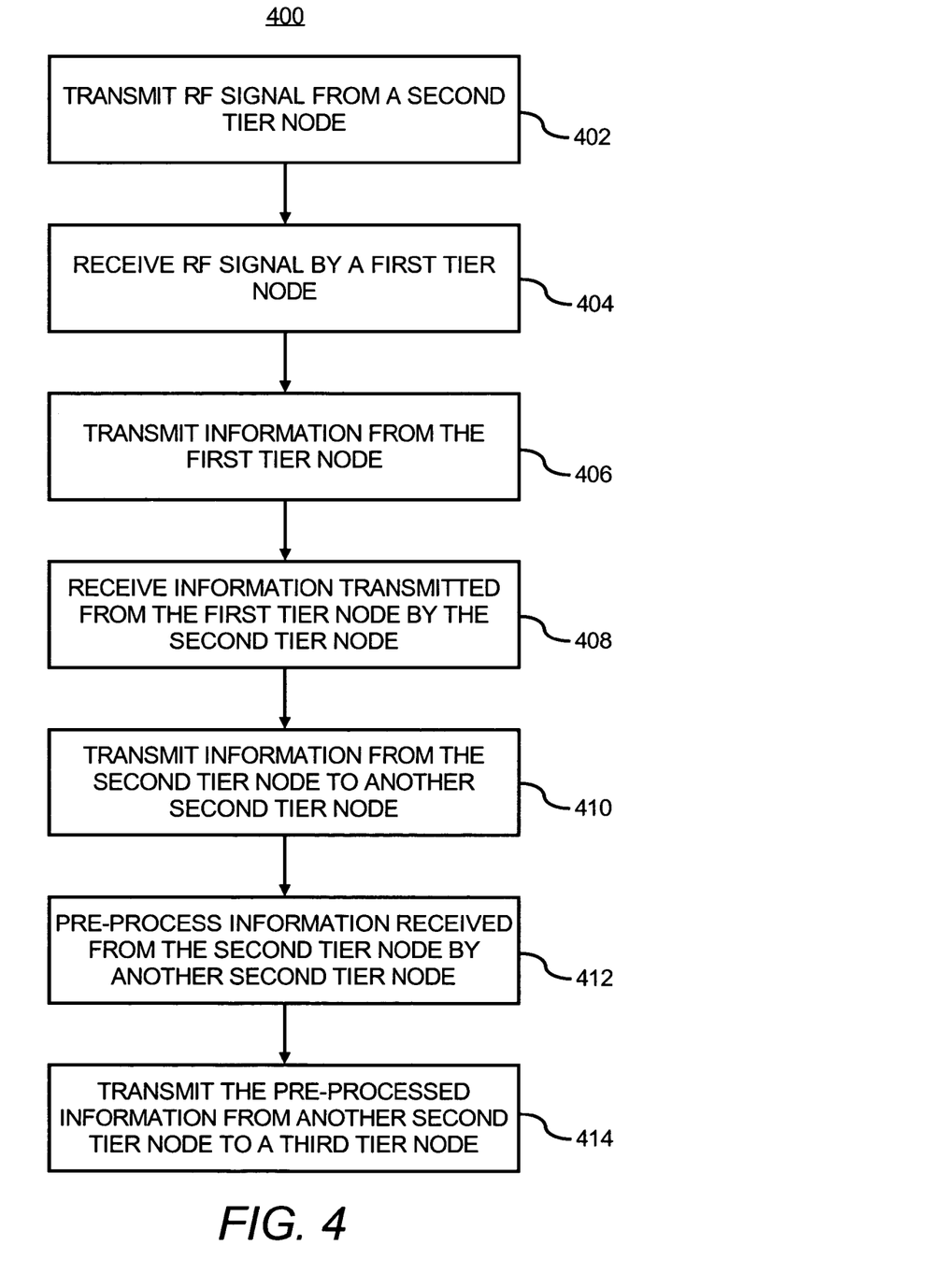
FIG. 4 illustrates a flow chart of a method for communicating detected condition information across a multi-tiered network, according to another embodiment.

FIG. 4 illustrates a flow chart of a method 400 for communicating detected condition information across a multi-tiered network according to another embodiment. The method 400 is also described with respect to FIGS. 1A, 1B, and 2 by way of example and not of limitation and it will be apparent that the method 400 may be used in other systems.

At step 402, a second tier node 108 substantially autonomously transmits an RF signal 220 to a first tier node 104. Thus, for instance, the second tier node 108 may transmit the RF signal 220 without receiving a command signal from a third tier node 112 or from another source, such as a human operator. At step 404, the first tier node 104 receives the RF signal 220 sent from the second tier node 108. As described above, the first tier node 104 may convert the RF signal 220 into electrical energy to enter into a powered state and may perform various functions. The various functions may include activation of one or more sensors 202 and transmission of the detected condition information to the second tier node 108, as indicated at step 406.

At step 408, the second tier node 108 may receive the detected condition information transmitted from the first tier node 104. At step 410, the second tier node 108 may transmit the information received from the first tier node 104 to another second tier node 108. In addition, or alternatively, the second tier node 108 may transmit the information to the third tier node 112.

One or both of the second tier node 108 and the another second tier node 108 may pre-process the information received from the first tier node 104. In addition, one or both of the second tier node 108 and the another second tier node 108 may transmit the pre-processed information to the third tier node 112 at step 414. The third tier node 112 may further process the information and display it to a user.

Some or all of the operations set forth in the methods 300 and 400 may be contained as a utility, program, or subprogram, in any desired computer accessible medium. In addition, some or all of the operations set forth in the methods 300 and 400 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 5:
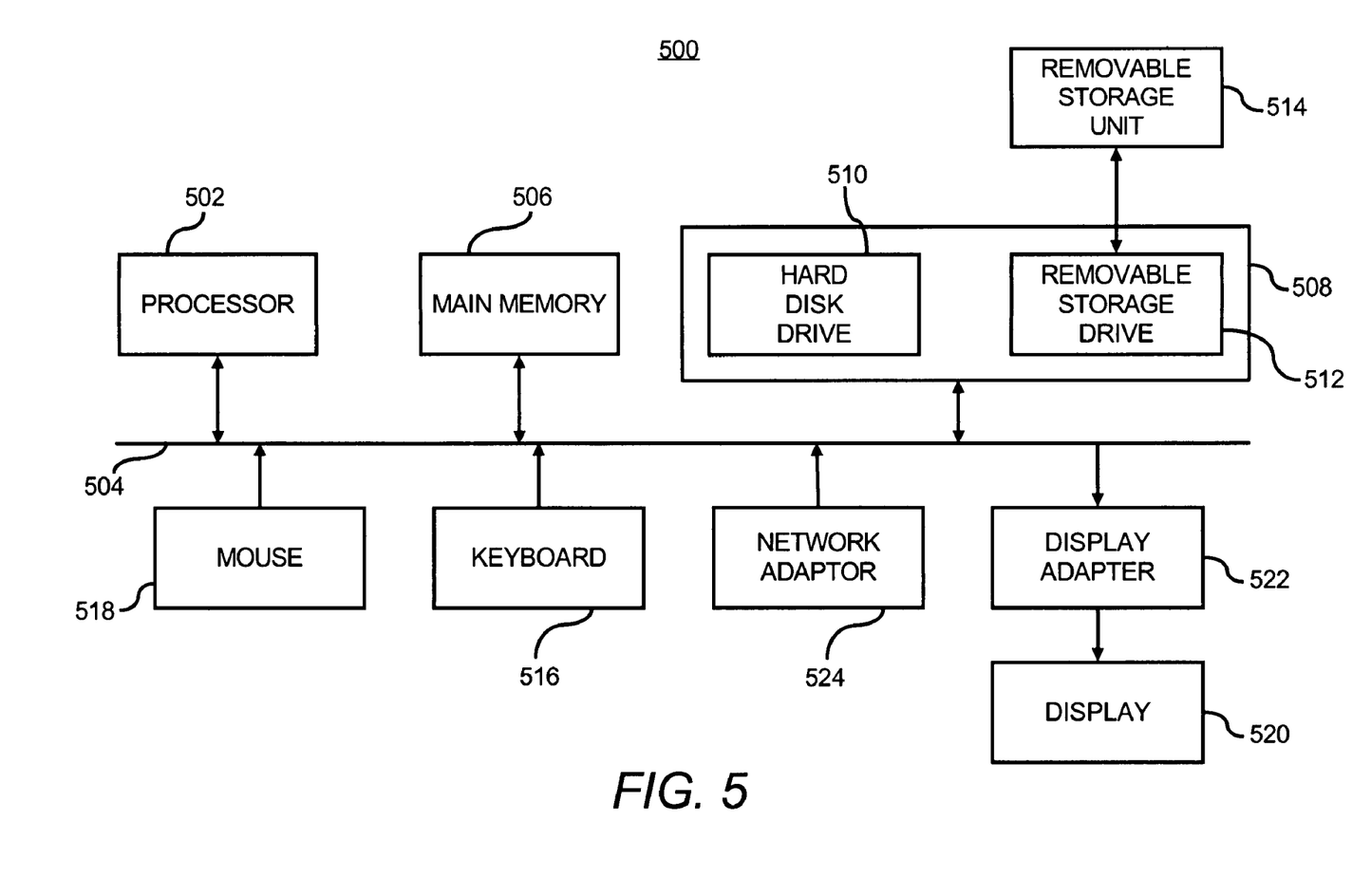
FIG. 5 illustrates a block diagram of a computer system which may be employed to perform the various functions of the third tier node 112, according to an embodiment.

FIG. 5 illustrates a computer system 500, which may be employed to perform the various functions of the third tier node 112 described herein above, according to an example. In this respect, the computer system 500 may be used as a platform for executing one or more of the functions described hereinabove with respect to the third tier node 112.

The computer system 500 includes a processor 502, which may be used to process information received from one or more second tier nodes 108. Commands and data from the processor 502 are communicated over a communication bus 504. The computer system 500 also includes a main memory 506, such as a random access memory (RAM), where the program code for, for instance, the third tier node 112, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for the management of power may be stored.

The removable storage drive 510 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor 502 may communicate over a network, for instance, the Internet, LAN, etc., through a network adaptor 524. In any regard, the display 520 and/or the network may be employed to provide information communicated to the third tier node 112 from the one or more second tier nodes 108.

It will be apparent to one of ordinary skill in the art that other known electronic components may be added or substituted in the computer system 500. In addition, the computer system 500 may include a system board or blade used in a rack in a data center, a conventional "white box" server or computing device, etc. Also, one or more of the components in FIG. 5 may be optional (for instance, user input devices, secondary memory, etc.).

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A multi-tiered network for gathering detected condition information, said network comprising:
    a first tier composed of a plurality of first tier nodes, wherein said plurality of first tier nodes comprises a radio frequency identification device (RFID) circuit and a sensor for detecting a condition;
    a second tier composed of at least one second tier node operable to receive the detected condition information from at least one of the plurality of first tier nodes in a substantially autonomous manner, said at least one second tier node comprising an RFID circuit, a power source, and circuitry for at least one of storing, processing, and transmitting the detected condition information;
    a hybrid node operable to function in multiple operating states, wherein one of said operating states includes functioning as a first tier node and another of said operating states includes functioning as second tier node; and
    a third tier composed of a third tier node, wherein the third tier node is configured to receive the detected condition information from at least one second tier node, and wherein the third tier node comprises an RFID receiver and circuitry for at least one of storing and processing the detected condition information.

2. The multi-tiered network of claim 1, wherein the third tier node is operable to receive information directly from at least one of the plurality of first tier nodes.

3. The multi-tiered network of claim 1, wherein the at least one second tier node is configured to emit a radio frequency (RF) signal for receipt by one or more of the plurality of first tier nodes, wherein the one or more of the plurality of first tier nodes are configured to convert the received RF signal received from the at least one second tier node into electrical energy, wherein the one or more of the plurality of first tier nodes are configured to use the electrical energy to at least one of detect the condition and transmit the detected condition information.

4. The multi-tiered network of claim 3, wherein the at least one second tier node is configured to receive the detected condition information in response to the emission of the RF signal.

5. The multi-tiered network of claim 4, wherein the at least one second tier node is configured to emit the RF signal at predetermined times to receive the detected condition information in the absence of an external instruction to emit the RF signal.

6. The multi-tiered network of claim 1, further comprising:
a plurality of second tier nodes, wherein one or more of the plurality of second tier nodes are configured to receive information from one or more of the plurality of second tier nodes, such that, the plurality of second tier nodes are operable to transmit the detected condition information from a second tier node at one location to a second tier node at another location.

7. The multi-tiered network of claim 1, wherein the hybrid node is operable to convert said operating state from functioning as a first tier node to functioning as a second tier node upon a command received from at least one of a second tier node and the third tier node.

8. The multi-tiered network of claim 1, wherein the hybrid node is operable to convert said operating state from functioning as a first tier node to functioning as a second tier node automatically when communication with at least one second tier node in the network is disrupted.

9. The multi-tiered network of claim 1, wherein the plurality of first tier nodes are positioned on a vehicle and are configured to detect a condition of the vehicle, and wherein the at least one second tier node is configured to substantially autonomously interrogate the plurality or first tier nodes to receive the detected condition information of the vehicle.

10. The multi-tiered network of claim 1, wherein the plurality of first tier nodes are spread across a relatively large field and are configured to detect at least one condition in an environment of the relatively large field, and wherein the at least one second tier node is configured to substantially autonomously interrogate the plurality of first tier nodes to receive detected condition information of the environment of the relatively large field.

11. A method for communicating detected condition information across a multi-tiered network, said network comprising a first tier having first tier nodes and a second tier having a second tier node, wherein the first tier nodes each comprise a sensor and a radio frequency identification device (RFID) circuit and wherein the network further comprises a hybrid node operable to function in multiple operating states, wherein one of said operating states includes functioning as a first tier node and another of said operating states includes functioning as a second tier node, said method comprising:
in at least one first tier node, receiving a radio frequency (RF) signal;
converting the RF signal into electrical energy;
activating the at least one first tier node to a powered state through use of the electrical energy, wherein, in the powered state, the at least one first tier node transmits the detected condition information;
in the second tier node, substantially autonomously receiving the detected condition information transmitted from the at least one first tier node; and at least one of, storing, processing, and transmitting the detected condition information received from the at least one first tier node; and
converting the operating state of the hybrid node from functioning as a first tier node to functioning as a second tier node in a substantially autonomous manner.

12. The method of claim 11, further comprising:
transmitting the RF signal from the second tier node in a substantially autonomous manner, and wherein receiving the RF signal further comprises receiving the RF signal transmitted from the second tier node.

13. The method of claim 11, wherein receiving the RF signal further comprises receiving external power from a device external to the network.

14. The method of claim 11, wherein the network further comprises a third tier having a third tier node, the method further comprising:
transmitting detected condition information from the second tier node to the third tier node in a substantially autonomous manner.

15. The method of claim 11, wherein the at least one first tier node includes a sensor, the method further comprising:
detecting said condition while in the powered state.

16. The method of claim 11, wherein the network comprises a plurality of second tier nodes, the method further comprising:
in the second tier node, receiving detected condition information from at least one other second tier node.

17. The method of claim 11, wherein converting the operating state of the hybrid node further comprises converting the operating state of the hybrid node from functioning as a first tier node to functioning as a second tier node in response to receipt of a communication from at least one of a second tier node and a third tier node to convert the operating state.

18. The method of claim 11, wherein converting the operating state of the hybrid node further comprises converting the operating state from functioning as a first tier node to functioning as a second tier node in a substantially autonomous manner in response to communication with a second tier node ceasing.

19. A multi-tiered network for gathering detected condition information, said network comprising:
a first tier having first tier nodes, said first tier nodes having a sensor for detecting a condition;
a second tier having at least one second tier node;
means for transmitting RF signals to first tier nodes from the at least one second tier node;
means for transmitting detected condition information from the first tier nodes to the at least one second tier node in response to receipt of the RF signals transmitted from the at least one second tier node;
in the at least one second tier node, means for receiving the detected condition information transmitted from the at least one first tier node, wherein the at least one second tier node is configured to transmit the RF signal in a substantially autonomous manner to thereby gather detected condition information from the first tier nodes without requiring substantial user intervention; and
a hybrid node operable to function in multiple operating states, wherein one of said operating states includes functioning as a first tier node and another of said operating states includes functioning as a second tier node.

* * * * *

UNITED STATES PATENT AND TRADEMARK OFFICE
CERTIFICATE OF CORRECTION

PATENT NO.        : 7,532,119 B2
APPLICATION NO.   : 11/269237
DATED             : May 12, 2009
INVENTOR(S)       : Alexandre M. Bratkovski et al.

Page 1 of 1

It is certified that error appears in the above-identified patent and that said Letters Patent is hereby corrected as shown below:

In column 12, line 48, in Claim 1, after "functioning as" insert -- a --.

Signed and Sealed this

Seventeenth Day of November, 2009

David J. Kappos
*Director of the United States Patent and Trademark Office*